United States Patent
Watts et al.

(10) Patent No.: US 9,142,010 B2
(45) Date of Patent: Sep. 22, 2015

(54) IMAGE ENHANCEMENT BASED ON COMBINING IMAGES FROM MULTIPLE CAMERAS

(71) Applicants: Lloyd Watts, Mountain View, CA (US); Carver Mead, Burien, WA (US)

(72) Inventors: Lloyd Watts, Mountain View, CA (US); Carver Mead, Burien, WA (US)

(73) Assignee: Audience, Inc., Mountain View, CA (US)

( * ) Notice: Subject to any disclaimer, the term of this patent is extended or adjusted under 35 U.S.C. 154(b) by 0 days.

(21) Appl. No.: 13/738,874

(22) Filed: Jan. 10, 2013

(65) Prior Publication Data

US 2013/0169844 A1    Jul. 4, 2013

Related U.S. Application Data

(63) Continuation-in-part of application No. 13/719,079, filed on Dec. 18, 2012.

(60) Provisional application No. 61/583,144, filed on Jan. 4, 2012, provisional application No. 61/590,656, filed on Jan. 25, 2012.

(51) Int. Cl.
*H04N 13/02* (2006.01)
*G06T 5/00* (2006.01)
(Continued)

(52) U.S. Cl.
CPC . *G06T 5/006* (2013.01); *G06T 5/50* (2013.01); *H04N 5/2258* (2013.01);
(Continued)

(58) Field of Classification Search
CPC ....................................................... G06T 5/50
USPC ............................................................ 348/47
See application file for complete search history.

(56) References Cited

U.S. PATENT DOCUMENTS

2011/0117958 A1* 5/2011 Kim et al. .................. 455/556.1
2012/0219180 A1* 8/2012 Mehra ........................... 382/103
(Continued)

FOREIGN PATENT DOCUMENTS

WO    WO-2011/096251 A1 *    8/2011 ....................... 348/47

OTHER PUBLICATIONS

Mahowald, M., VLSI Analogs of Neuronal Signal Processing: A Synthesis of Form and Function, http://www.ini.uzh.ch/~tobi/papers/mishathesis.pdf, Caltech Ph.D. Thesis, 1992.
(Continued)

*Primary Examiner* — Richard Torrente
(74) *Attorney, Agent, or Firm* — Carr & Ferrell LLP

(57) ABSTRACT

Provided are systems and methods for image enhancement based on combining multiple related images, such as images of the same object taken from different imaging angles. This approach allows simulating images captured from longer distances using telephoto lenses. Initial images may be captured using simple cameras equipped with shorter focal length lenses, typically used on camera phones, tablets, and laptops. The initial images may be taken using two different cameras positioned a certain distance from each other. An object or, more specifically, a center line of the object is identified in each image. The object is typically present in the foreground portion of the initial images. The initial images may be cross-faded along the object center line to yield a combined image. Separating of the foreground and background portions of each image may be separated and separately processed, such as blurring the background portion and sharpening the foreground portion.

20 Claims, 8 Drawing Sheets

(51) Int. Cl.
  H04N 5/262 (2006.01)
  H04N 5/225 (2006.01)
  G06T 5/50 (2006.01)
(52) U.S. Cl.
  CPC ... *H04N 5/2621* (2013.01); *G06T 2207/10012* (2013.01); *G06T 2207/20221* (2013.01); *G06T 2207/30201* (2013.01)

(56) References Cited

U.S. PATENT DOCUMENTS

2012/0242662 A1* 9/2012 Ninan et al. ............ 345/419
2012/0293633 A1* 11/2012 Yamato .................. 348/47

OTHER PUBLICATIONS

M. Okutomi, T. Kanade, "A Multiple-Baseline Stereo", IEEE Transactions on Pattern Analysis and Machine Intelligence, Apr. 1993, vol. 15 No. 4, pp. 353-363, http://www.computer.org/portal/web/csdl/abs/trans/tp/1993/04/ i0353abs.htm.

M. J. Hannah, "A system for digital stereo image matching,"Photogram. Eng. Remote Sensing, vol. 55, No. 12, pp. 1765-1770, Dec. 1989.

R. C. Bolles, H. H. Baker, and D. H. Marimont, "Epipolar-plane image analysis: An approach to determining structure from motion,"Int. J. Comput. Vision, vol. 1, No. 1, 1987.

L. Matthies, R. Szeliski, and T. Kanade, "Kalman filter-based algorithms for estimating depth from image seguences,"Int. J. Comput. Vision, vol. 3, pp. 209-236, 1989.

H. P. Moravec, "Visual mapping by a robot rover," inProc. IJCAI, 1979, pp. 598-600.

L. Matthies and M. Okutomi, "A Bayesian foundation for active stereo vision," inProc. SPIE Sensor Fusion II: Human Machine Strategies, Nov. 1989, pp. 62-74.

T. Kanade and T. Nakahara, "Experimental results of multibaseline stereo," in IEEE Special Workshop Passive Ranging(Princeton, NJ), Oct. 1991.

G. Bradski and A. Kaehler, "Learning OpenCV," Sep. 2008, pp. 22-24, 109-115, 214-219, 303, 427-452, 459-461, 463, 484-485, 506-513.

Frederick M. Waltz and John W.V. Miller, "An efficient algorithm for Gaussian blur using finite-state machines," SPIE Conf. on Machine Vision Systems for Inspection and Metrology VII, Nov. 1998, pp. SK21-1-8.

Potmesil et al., "Synthetic Image Generation with a Lens and Aperture Camera Model," ACM Transactions on Graphics, vol. 1, No. 2, Apr. 1982, pp. 85-108.

* cited by examiner

IMAGE ENHANCEMENT BASED ON COMBINING IMAGES FROM MULTIPLE CAMERAS

CROSS-REFERENCE TO RELATED APPLICATIONS

This application is a continuation-in-part of application Ser. No. 13/719,079, filed Dec. 18, 2012, which claims the benefit of U.S. Provisional Patent Application No. 61/583,144, filed Jan. 4, 2012, and U.S. Provisional Patent Application No. 61/590,656, filed Jan. 25, 2012; and this application claims the benefit of U.S. Provisional Patent Application No. 61/590,656, filed Jan. 25, 2012; all applications are incorporated herein by reference in their entirety.

FIELD

This application relates generally to image enhancement and more specifically to computer-implemented systems and methods for image enhancement based on combining images from multiple cameras.

BACKGROUND

Many modern electronic devices, such as smart phones and laptops, are equipped with cameras. However, the quality of photo and video images produced by these cameras is often less than desirable. One problem is that these electronic devices use relatively inexpensive cameras and lenses in comparison, for example, with professional cameras. Another problem is a relatively small size of the mobile devices (the thickness of the mobile devices, in particular) requires the optical lens to be small as well. Furthermore, mobile devices are often operated at closed proximity to the object, e.g., between 300 mm and 900 mm and are equipped with a short focal length lens. As such, the produced images often suffer from perspective distortion resulting from using short focal length cameras at close distance to the subject.

SUMMARY

Provided are computer-implemented systems and methods for image enhancements based on combining multiple related images, such as images of the same object taken from different angles. According to various embodiments, this approach allows multiple images from nearby cameras to be combined to simulate a single image from a more distant camera. Initial images may be captured using simple cameras, such as those having short focal length lenses typically used in camera phones, tablets, and laptops. The initial images may be taken using two different cameras positioned at a certain distance from each other. An object or, more specifically, a center line of the object is identified in each image. The object is typically present on the foreground of the initial images. As such, detecting the foreground portion of each image may be performed before the center line identification. The initial images may be aligned and cross-faded. The foreground portion may be separated from the background portion. The background portion may be blurred or, more generally, processed separately from the foreground portions. The above-described steps in the process need not all be done in the order specified, but may be done in a different order for convenience or efficiency depending on the particular application and its specific requirements.

In some embodiments, a method of combining multiple related images to enhance image quality involves receiving two initial images, such that each initial image includes an object provided on a foreground portion of this image and each initial image corresponds to a different imaging angle relative to the object (e.g., right and left images). Additional initial images may be provided as well. For example, three or more images corresponding to different imaging angles (e.g., right, center, and left images) may be provided in some embodiments. The method may proceed with detecting the object presented in each initial image and determining an object center line of the object in each initial image. For example, an object may be a person's face, while the object center line may be the line extending through the nose. It should be noted that in some embodiments, the object center line may not necessarily divide the object into equally sized portions. In some embodiments, one portion may be slightly larger than the other portion, which may depend on imaging angle. Determination of the object center line may involve analyzing the two images and determining, for example, the most common lines in each of the two initial images that would later allow these initial images to be cross-faded along these lines. The method may continue with cross-fading the multiple initial images along the object center line such that cross-fading yields a combined image. The cross-fading may involve manipulations of portions of the initial images that are defined by the object center lines. In some embodiments, the method involves aligning the multiple initial images along the object center line to ensure the proper level of different initial images, in particular when the images are taken at different times.

In some embodiments, the method involves capturing the multiple initial images. These images may be captured using two or more cameras provided on one device, e.g., the cameras being positioned at a distance of between about between about 30 millimeters and 150 millimeters from each other. The device including these cameras may be one of a laptop computer system, a tablet computer system, or a camera phone.

In some embodiments, the multiple initial images may be stereo images having stereo disparity. The stereo disparity is one example of a difference between the two initial images that is relied on to enhance the resulting images. Other kinds of differences may be used as well. In some embodiments, detecting the object in each initial image may include one or more techniques selected from the group consisting of motion parallax, local focus, color grouping, and face detection. The face detection may be particularly useful for video conferences when a human face is typically a central object of the image.

In some embodiments, foreground and background portions of the initial images are processed differently. As such, the combined image may include a combined foreground portion and a combined background portion. The combined foreground portion includes a combined object created by cross-fading the objects of the multiple initial images. In some embodiments, the method also involves changing one or more properties of the combined foreground portion, such as changing sharpness, as well as changing, colorizing, suppressing, and changing saturation. One or more of these properties may be also changed on the combined background.

In some embodiments, the combined background portion is blurred using one or more techniques, such as a circular blurring and a Gaussian blurring. The combined background portion may be blurred adaptively. The adaptive aspect may depend on differences in positions of object center lines on the foreground and background portions. Additional differences in these positions may drive more blurring of the background. Furthermore, the adaptive aspect may be applied to determining the background and foreground, i.e., adapting the separation between the two to address movement of the object resulting in changing distances between the object and cameras. In some embodiments, the combined background portion is replaced with a new background image.

In some embodiments, the method involves determining the foreground portion of each initial image and may also involve separating the foreground portion from a background portion of each initial image and processing each portion separately. As stated above, the processing or, more specifically, cross-fading the multiple initial images may be performed independently on background and foreground portions of these images. In some embodiments, cross-fading of the background portions involves shifting at least some of the background portions in towards the object center line. In some embodiments, the method involves repeating the receiving, determining, aligning, and cross-fading operations at least once. The multiple initial images may represent one frame of a video.

In some embodiments, a method of combining multiple related images to enhance image quality involves capturing multiple initial images using different cameras positioned on the same device. The cameras may be positioned, for example, at a distance of between about 30 millimeters and 150 millimeters from each other. The method may proceed with determining a foreground portion of each initial image. The method continues with determining an object center line in each foreground portion of the multiple initial images. The method may proceed with cross-fading the foreground portions of the multiple initial images along the object center line, such that the cross-fading yields a combined image. The method may also include separating the foreground portion from a background portion of each initial image, suppressing the background portion (e.g., blurring) and/or enhancing the foreground portion.

Provided also is a device including a first camera and a second camera, such that the distance between the first camera and the second camera is between about 30 millimeters and 150 millimeters. The first camera and the second camera are configured to capture two initial images of the same object from different imaging angles. The device also includes a processing module being configured for detecting an object in each of the two initial images, determining an object center line of the object in each of the two initial images, aligning the two initial images along the object center line, and cross-fading the two initial images along the object center line yielding a combined image. Furthermore, the device also includes a storage module for storing the two initial images and the combined image.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

Introduction

Many modern devices are equipped with cameras, which provide additional functionality to these devices. At the same times, the devices are getting progressively smaller to make their use more convenient. Examples include camera phones, tablet computers, laptop computers, digital cameras, and other like devices. A camera phone example will now be briefly described to provide some context to this disclosure. A camera phone is a mobile phone, which is able to capture images, such as still photographs and/or video. Currently, the majority of mobile phones in use are camera phones. The camera phones generally have lenses and sensors that are simpler than dedicated digital cameras, in particular, high end digital cameras such as DSLR camera. The camera phones are typically equipped with shorter focal length and fixed focus lenses and smaller sensors, which limit their performance.

Cost and size constraints limit optical features that can be implemented on the above referenced devices. Specifically, the thin form factors of many devices make it very difficult to use long lenses (with wide apertures for capturing high-quality limited-depth-of-field effects (i.e. sharp subject, blurry background)). For this reason, close-up pictures shot with camera phones are usually taken too close to the subject, leading to strong perspective distortion.

Figure 1:
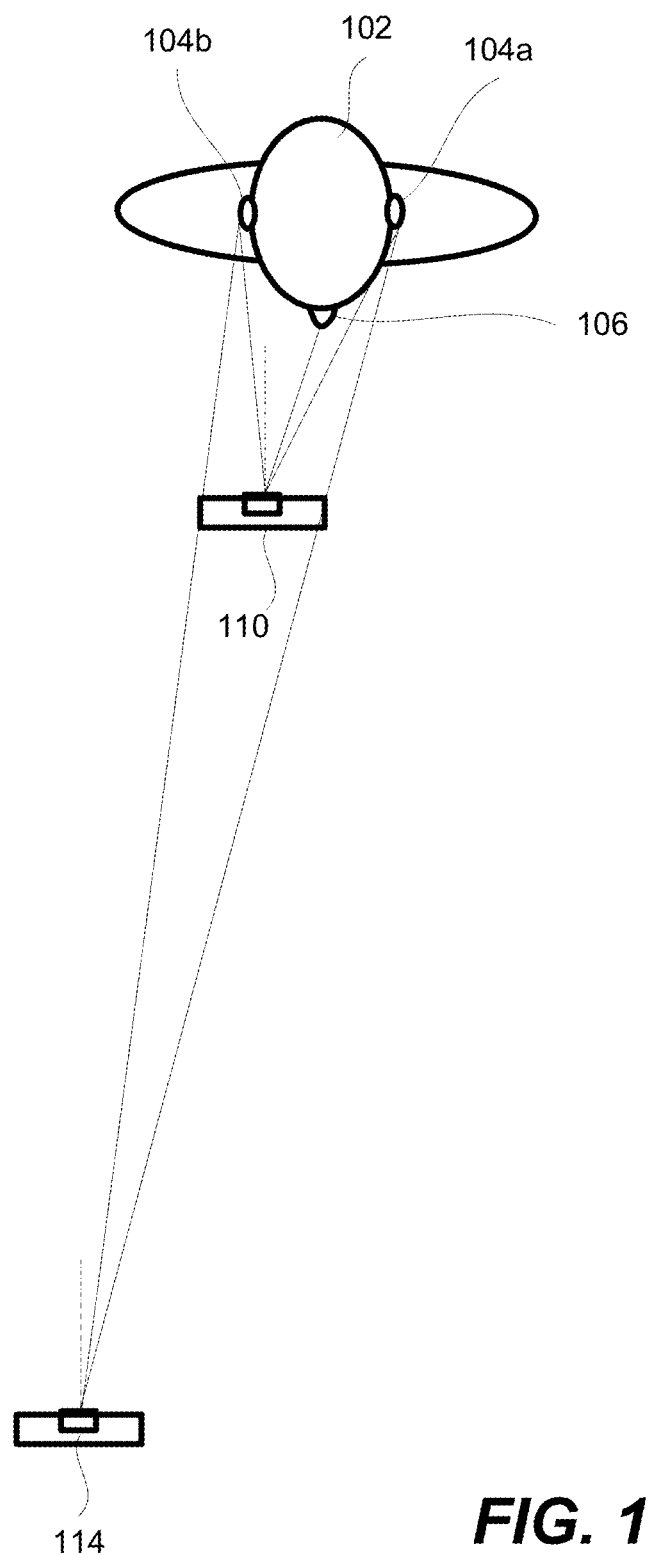
FIG. 1 illustrates a schematic top view of an object and different image capturing devices positioned at different distances and angles relative to the object, in accordance with some embodiments.

Provided are computer-implemented systems and methods combining multiple low quality images into one higher quality image thereby producing image enhancement. This approach allows simulating images captured from longer distances by combining multiple images captured from short distances. FIG. 1 shows the difference in viewing angles for a close camera and a far camera, illustrating a schematic top view of an object 102 and different image capturing devices 110 and 114 positioned at different distances relative to the object 102, in accordance with some embodiments. For clarity, a few features of object 102 are identified, such as a right ear 104a, a left ear 104b, and a nose 106. Despite the fact that device 114 is shifted to the left from the object 102, it is still able to capture both ears 104a and 104b while not being turned too much with respect to the nose. As such, device 114 (that needs to be equipped with a longer focal length lens, e.g., a telephoto lens, relative to device 110) will take a high quality and undistorted image of object 102. However, when a short focal length camera/device 110, which is similarly shifted to the left from the object 102 attempts to take a similar image, it will only be able to capture left ear 104b. Furthermore, nose 106 is being captured at a sharp angle, which may result in distortions of its proportion relative to other parts.

Figure 2A:
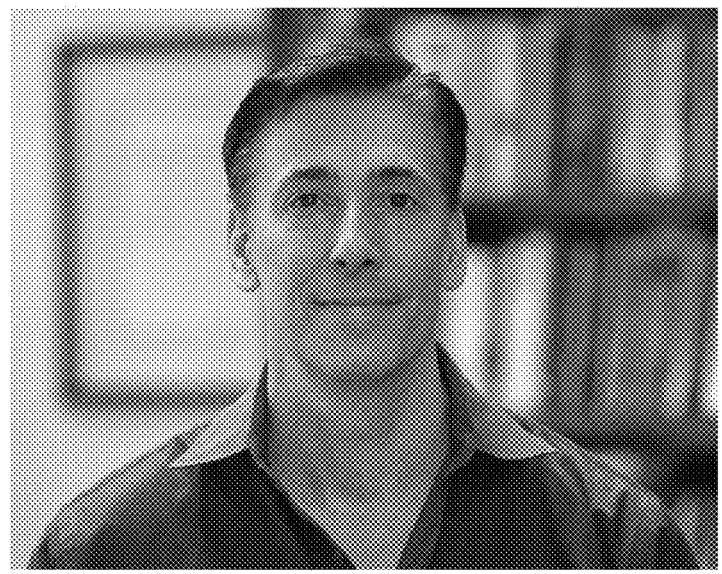
FIG. 2A illustrates an image of an object captured from far away using a long focal length lens, in accordance with some embodiments.
Figure 2B:
FIG. 2B illustrates an image of the same object (as in FIG. 2A) captured at a short distance away from the object using a short focal length lens, in accordance with some embodiments.

Actual results of using long and short focal length lenses are presented in FIGS. 2A and 2B, respectively. Specifically, FIG. 2A illustrates an image of an object captured from far away using a long focal length (telephoto) lens (similar to device 114 in FIG. 1), in accordance with some embodiments, while FIG. 2B illustrates an image of the same object captured at a short distance away from the object using a short focal length (wide angle) lens (similar to device 110 in FIG. 1), in accordance with different embodiments.

It is common to take pictures of subjects from short distances, for example, on the order of two feet away or less. This may occur, for example, when using a camera mounted on the bezel of a laptop computer screen during a video-conference, when taking a hand-held picture of oneself using a cell-phone camera, and similar photography with a portable device. When the lens-to-subject distance is short, there may be an unflattering perspective distortion of the subject (e.g., usually the face of the subject) which has the appearance of, for example, making the nose look large, ears recede behind the head, and face and neck to look unnaturally thin.

Some embodiments may include cameras that may be operated at short camera-to-subject distances, with short lenses, and may produce images that look as though the camera were further away with a long lens, thus minimizing such perspective distortion effect and creating a flattering image of the subject. Initial images may be captured using simple cameras, such as short focal length cameras and cameras with short lenses, typically used on camera phones, tablets, and laptops. The initial images may be taken using two different cameras positioned at a certain distance from each other. An object or, more specifically, a center line of the object is identified in each image. The object is typically present on the foreground of the initial images. As such, detecting the foreground portion of each image may be performed before the center line identification. The initial images may be aligned and cross-faded. The foreground portion may be separated from the background portion. The background portion may be blurred or, more generally, processed separately from the foreground portions. The steps in the above-described process need not all be done in the order specified, but may be done in a different order for convenience or efficiency depending on the particular application and its specific requirements.

Figure 3:
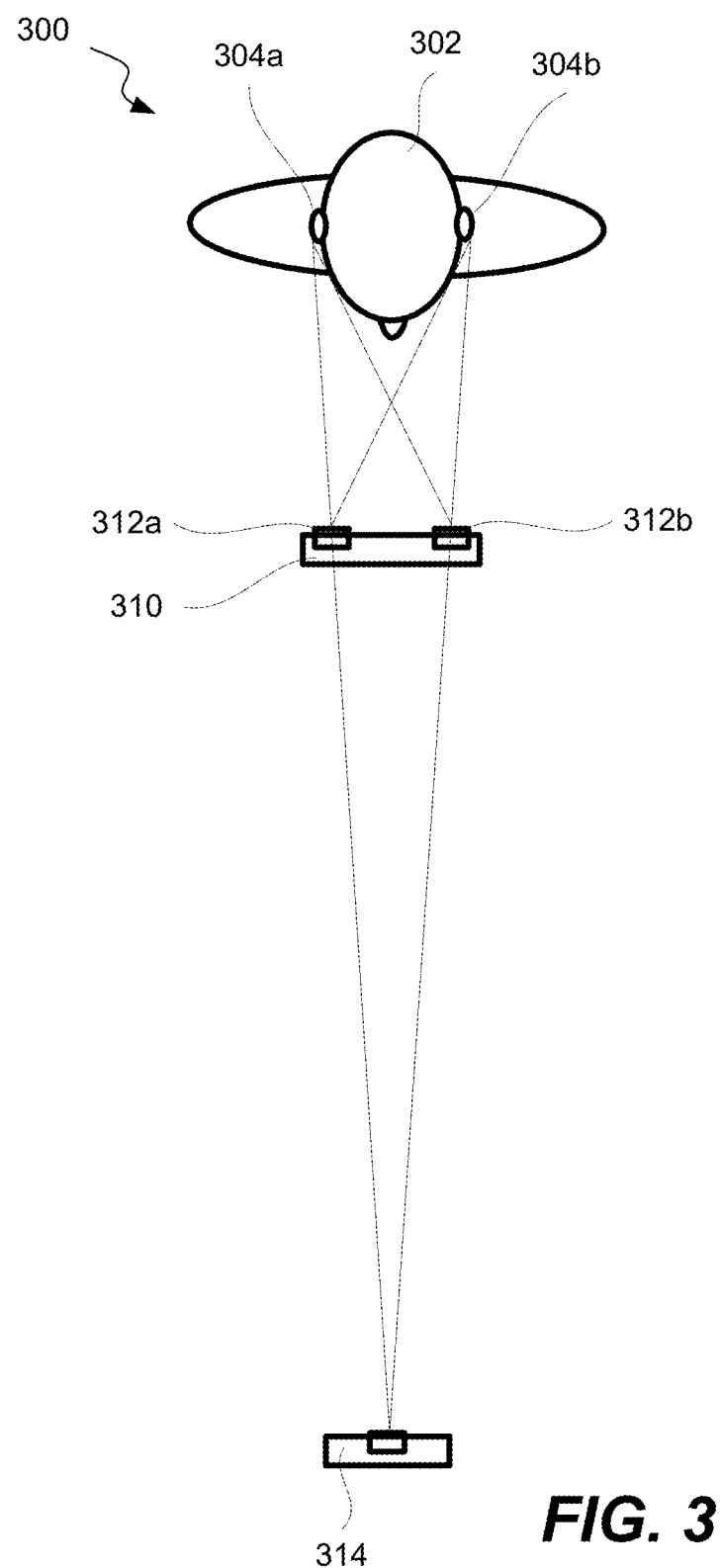
FIG. 3 illustrates a top view of a device equipped with two cameras and an equivalent single camera device showing relative positions of the devices to an object, in accordance with some embodiments.

FIG. 3 illustrates a top view 300 of a device 310 equipped with two cameras 312a and 312b and an equivalent single camera device 314 showing relative positions of devices 310 and 314 to an object (head) 302, in accordance with some embodiments. Cameras 312a and 312b, taken together, can see both sides of object 302, similar to the nearly-equivalent distant camera device 314, whereas each of cameras 312a and 312b in isolation may not be able see both sides of the head 302. Specifically, left camera 312a may have a better view of left ear 304a and insufficient view of right ear 304b, while right camera 312b may have a better view of right ear 304b and insufficient view of left ear 304a. When two images taken by both left camera 312a and right camera 312b are combined, the combined image included adequate representations of right and left ears 304a and 304b.

In some embodiments, a method of combining the images from the left and right cameras into a composite image involves detecting the foreground object (i.e., subject) in two camera images. This may be done, for example, using stereo disparity and/or face detection on the two images. The method may proceed with aligning and, in some embodiments, scaling the two images at the center of the foreground object. The two images are then cross-faded into a combined (or composite) image, such that the left side of the image comes from the left camera, while the right side of the image comes from the right camera. The cross-fade region may be narrow enough that the images have good alignment within it. The method optionally involves blurring the background in the composite image.

It should be noted that two camera systems that may be used for capturing initial images are different from stereo 3D camera, which present both images to the eyes of the viewer and create a full 3D experience for the viewer. Instead, only one combined image is provided in the described methods and systems and initially captured stereo images are not shown to the viewer. The initial images are combined so as to create the appearance of a single higher-quality image shot from further away.

Some applications of these methods may include, for example, a video-conferencing system running on a laptop or desktop computer, stand-alone video-conferencing system, video-conferencing system on a mobile device such as a smart-phone, front-facing camera for taking pictures of oneself on a smart-phone/mobile device, a standalone still camera, stand-alone video camera, any camera where an undistorted image is needed but it is impossible or impractical to move the camera back far enough from the subject, and the like.

In some embodiments two or more cameras may be used. For example, with three cameras (e.g., left, center, and right) the composite image may be composed of the left portion of the left image, center portion of the center image, and right portion of right image, resulting in reduced perspective distortion compared to the image obtained from a single distant camera.

Figure 4A:
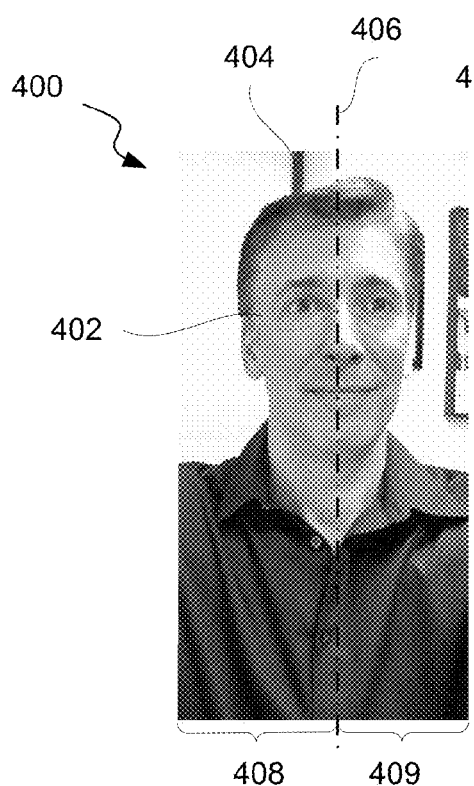
FIGS. 4A and 4B illustrate two initial images prior to combining these images, in accordance with some embodiments.
Figure 4B:
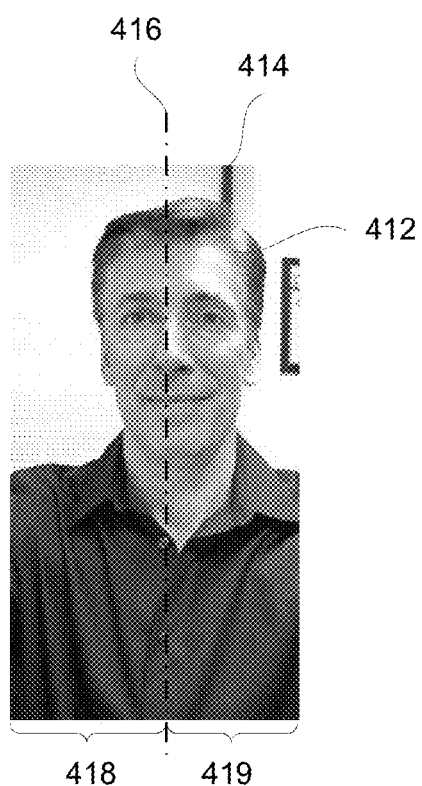

FIGS. 4A and 4B illustrate an example of two initial images 400 and 410 that are combined to enhance quality of the resulting image, in accordance with some embodiments. For simplicity, initial image 400 will be referred to as a left image, while initial image 410 will be referred to as a right image. The left and right images may be obtained using two cameras or lenses provided on the same device (e.g., devices described above with reference to FIG. 3) and captured at substantially the same time, such that the object maintains the same orientation (i.e., does not move) in both images. In some embodiments, the same camera or lens may be used to capture the left and right images by moving the object or the camera with respect to each other.

Each initial image includes slightly different representations of the same object, i.e., left image 400 includes object representation 402, while right image 410 includes object representation 412. There are slight differences in these object representations. For example, object representation 402 has a more visible left ear, while the right ear is barely visible. It should be noted that all special orientations are referred to the images; the actual object orientations may be different. On the other hand, object representation 412 has a more visible right ear, while the left ear is only slightly visible. Furthermore, object representation 402 shows the actual object (person) being turned (e.g., looking) slightly to the right, while object representation shows the actual object looking straight and may be turned slightly to the left. When two initial images are used, the difference of object representations is called stereo disparity.

Differences in the representations of the objects of two or more initial images may be used in order to enhance these object representations and yield a combined imaged with the enhanced representation. However, too much difference due to the spacing of the cameras may cause problems with alignment and cross-fading, resulting in lower quality representations than even in the initial images. For example, too much difference in imaging angles may cause such problems. In some embodiments, the cameras are positioned at a distance of between about between about 30 millimeters and 150 millimeters from each other.

The difference between object representations 402 and 412 caused by different imaging angles with respect to the object is described above with reference to FIG. 3. It should be noted that when representations of multiple objects are present in two or more initial images, the representations may vary depending on proximity of the object to the camera. For example, the main object may be present on a foreground, while some additional objects may be present on a background. The images 400 and 410 include object representations 402 and 412 that appear on the foreground and, for example, window edge representations 404 and 414 that appear on the background. While both sets of representations are of the same two actual objects (i.e., the person and the window edge) that maintained the same relative positions while capturing these images, the positions of their representations are different. For example, window edge representations 404 is positioned around the left portion of the head in left image 400, while window edge representations 414 is positioned around the right portion of the head in right image 410. In other words, relative positions of object representations depend on their distances from the image capturing lenses. To address this discrepancy, the initial images may be decomposed into foreground portions and background portions and each type may be processed independently from each other as further described below.

The process may involve determining an object center line in each of the initial image. The object center line may represent a center of the object representation or correspond to some other features of the object representation (e.g., a nose, separation between eyes). Object center lines generally do not correspond to centers of initial images and portions of the initial images divided by the center lines may be different. For example, object center line 406 divides image 400 into left portions 408 and right portion 409. In a similar manner, object center line 416 divides image 410 into left portions 418 and right portion 419. Both center lines 406 and 416 extend vertically through the centers of the noses of the object representations 402 and 412, respectively.

Figure 5:
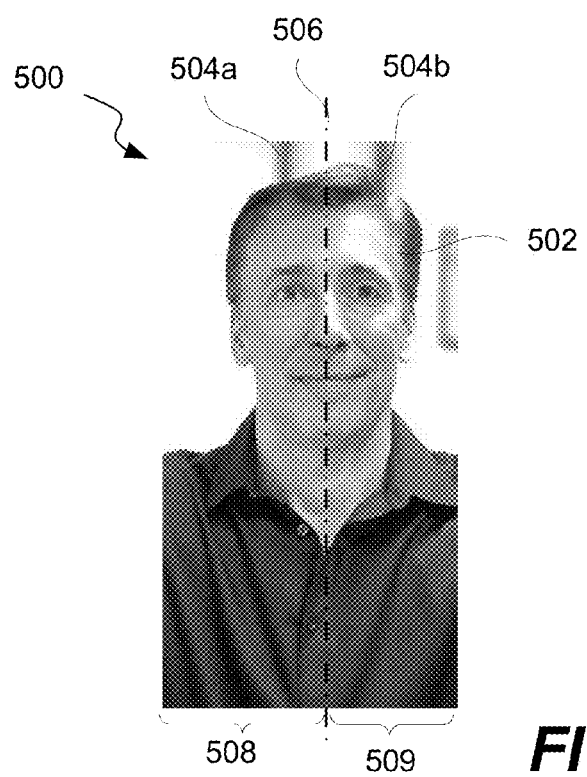
FIG. 5 illustrates a combined images resulting from cross-fading of the two initial images shown in FIGS. 4A and 4B, in accordance with some embodiments.

FIG. 5 illustrates a combined image 500 generated from initial images 400 and 410 illustrated in FIGS. 4A and 4B, in accordance with some embodiments. Specifically, object center line 506 generally corresponds to center lines 406 and 416 of initial images 400 and 410. Left portion 508 of combined image 500 represents a modified version of left portion 408 of left image 400, while right portion 509 represents a modified version of right portion 419 of right image 410. These modifications may come from cross-fading to provide a more uniform combined image and transition between two portions 508 and 509. For example, left portion 408 of left image 400 may be cross-faded with left portion 418 of right image 410 to form left portion 508 of combine image. Only a part of left portion 418, in particular the part extending along center line 416 may be used for cross-fading. In a similar manner, right portion 419 of right image 410 may be cross-faded with right portion 409 of left image 400 or, more specifically, with a part of right portion 409 extending along center line 406 to form right portion 509.

The quality of combined image 500 depends on how well center lines 406 and 416 are identified and how well the cross-fading is performed. Object representation 502 on combined image 500 includes clear view of both ears, which was missing in either one of initial images 400 and 410. The object in object representation 502 appears to be looking straight and not to the left or right as appears in initial images 400 and 410. However, representations of background objects in combined image 500 may not be as successful. For example, window edge representations 404 and 414 of the same actual window edge appear as two different representations 504*a* and 504*b*. Such problems may be confusing and distracting. To address these problems, the background may be blurred or completely replaced (e.g., with an alternate background image). Furthermore, processing of foreground and background portions of initial images may be performed separately to address the above referenced problems. For examples, separate object center lines may be identified for different objects, e.g., objects on the foreground and objects on the background. The cross-fading may be performed independently along these different object center lines. It should be noted that when processing videos, objects may move and may change their distances to cameras. As such separation between background object and foreground objects may be performed dynamically. Furthermore, more than two (i.e., the background and foreground) depth zones may be identified for initial images and portions of images falling into each depth zone may be processed independently. While this approach creates additional computational complexity, it creates more enhanced combined images and may be particularly suitable for still images. It should be noted that techniques described herein can be used for both still and moving images (e.g., video conferencing on smart-phones or on personal computers or video conferencing terminals).

Examples of Image Processing Methods

Figure 6:
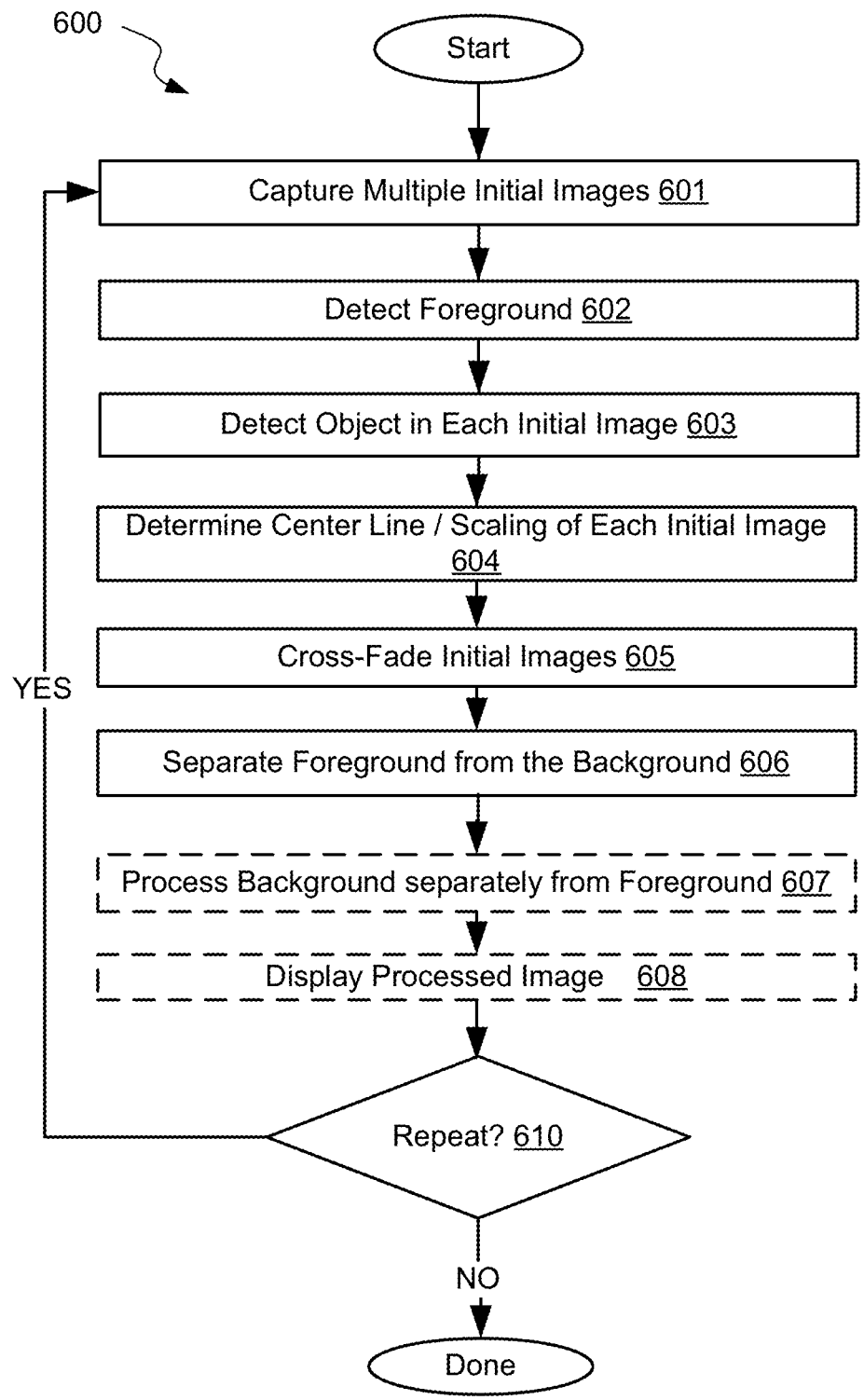
FIG. 6 is a process flowchart of a method for processing an image, in accordance with some embodiments.

FIG. 6 is a process flowchart of a method 600 for processing an image, in accordance with some embodiments. Method 600 may commence with capturing one or more images during operation 601. In some embodiments, multiple cameras are used to capture different images. Various examples of image capturing devices having multiple cameras are described above. In other embodiments, the same camera may be used to capture multiple images, for example, with different imaging angles. Multiple images from multiple cameras used in the same processing should be distinguished from multiple images processed sequentially as, for example, during processing of video images.

It should be noted that an image capturing device may be physically separated from an image processing device. These devices may be connected using a network, a cable, or some other means. In some embodiments, the image capturing device and the image processing device may operate independent and may have no direct connection. For example, an image may be captured and stored for a period of time. At some later time, the image may be processed when it is so desired by a user. In a specific example, image processing functions may be provided as a part of a graphic software package.

In some embodiments, two images may be captured during operation 601 by different cameras or, more specifically, different optical lenses provided on the same device. These images may be referred to as stereo images. In some embodiments, the two cameras are separated by between about 30 millimeters and 150 millimeters. As described above, this distance is the most suitable when the object is within 300 millimeters and 900 millimeters from the camera. One or more images captured during operation 601 may be captured using a camera having a relatively small apertures which increases the depth of field. In other words, this camera may be provide very little depth separation and both background and foreground portions of the image may have similar sharpness.

Method 600 may proceed with detecting at least the foreground portion in the one or more images during operation 602. This detecting operation may be based on one or more of the following techniques: stereo disparity, motion parallax, local focus, color grouping, and face detection. These techniques will now be described in more detail.

The motion parallax may be used for video images. It is a depth cue that results from a relative motion of objects captured in the image and the capturing device. In general, a parallax is a displacement or difference in the apparent position of an object viewed along two different lines of sight. It may be represented by the angle or semi-angle of inclination between those two lines. Nearby objects have a larger parallax than more distant objects when observed from different positions, which allows using the parallax values to determine distances and separate foreground and background portions of an image.

The face detection technique determines the locations and sizes of human faces in arbitrary images. Face detection techniques are well known in the art, see e.g., G. Bradski, A. Kaehler, "*Learning OpenCV*", September 2008, incorporated by reference herein. Open Source Computer Vision Library (OpenCV) provides an open source library of programming functions mainly directed to real-time computer vision and cover various application areas including face recognition (including face detection) and stereopsis (including stereo disparity), and therefore such well known programming functions and techniques will not be described in all details here. According to a non limiting example, a classifier may be used according to various approach to classify portions of an image as either face or non-face.

In some embodiments, the image processed during operation 602 has stereo disparity. Stereo disparity is the difference between corresponding points on left and right images and is well known in the art, see e.g., M. Okutomi, T. Kanade, "*A Multiple-Baseline Stereo*", IEEE Transactions on Pattern Analysis and Machine Intelligence, April 1993, Vol. 15 no. 4, incorporated by reference herein, and will therefore not be described in all details here. As described above, the OpenCV library provides programming functions directed to stereo disparity.

The stereo disparity may be used during detecting operation 602 to determine proximity of each pixel or patch in the stereo images to the camera and therefore to identify at least the background portion of the image.

Operation 603 involves detecting the object in each initial image. This operation may involve one or more techniques described above that are used for detecting the foreground portion. Generally, the object is positioned on the foreground of the image. In the context of video conferences, the object may be a person and face recognition techniques may be used to detect the object.

Operation 604 involves determining an object center line of the object in each initial image as described above with reference to FIGS. 4A and 4B. In some embodiments, other alignment and/or scaling techniques may be used during operation 604. The method continues with cross-fading the two initial images along the object center line thereby yielding a combined image during operation 605. A few aspects of this operation are described above with reference to FIG. 5.

In operation 606, the foreground portion may be separated from the background portion. In various embodiments, the background may be processed separately from the foreground portion in operation 607. Other image portion types may be identified, such as a face portion, an intermediate portion (i.e., a portion between the foreground and background portion), in some embodiments. The purpose of separating the original image into multiple portions is so that at least one of these portions can be processed independently from other portions.

The processing in operation 607 may involve one or more of the following techniques: defocusing (i.e., blurring), changing sharpness, changing colors, suppressing, and changing saturation. Blurring may be based on different techniques, such as a circular blur or a Gaussian blur. Blurring techniques are well known in the art, see e.g., G. Bradski, A. Kaehler, "*Learning OpenCV*", September 2008, incorporated by reference herein, wherein blurring is also called smoothing, and Potmesil, M.; Chakravarty, I. (1982), "Synthetic Image Generation with a Lens and Aperture Camera Model", ACM Transactions on Graphics, 1, ACM, pp. 85-108, incorporated by reference herein, which also describes various blur generation techniques. In some embodiments, an elliptical or box blur may be used. The Gaussian blur, which is sometimes referred to as Gaussian smoothing, used a Gaussian function to blur the image. The Gaussian blur is known in the art, see e.g., "*Learning OpenCV*", ibid.

In some embodiments, the image is processed such that sharpness is changed for the foreground or background portion of the image. Changing sharpness of the image may involve changing the edge contrast of the image. The sharpness changes may involve low-pass filtering and resampling.

In some embodiments, the image is processed such that the background portion of the image is blurred. This reduces distraction and focuses attention on the foreground. The foreground portion may remain unchanged. Alternatively, the foreground portion of the image may be sharpened.

In some embodiments, the processed image is displayed to a user as reflected by optional operation 608. The user may choose to perform additional adjustments by, for example, changing the settings used during operation 606. These settings may be used for future processing of other images. The processed image may be displayed on the device used to capture the original image (during operation 602) or some other device. For example, the processed image may be transmitted to another computer system as a part of teleconferencing.

In some embodiments, the image is a frame of a video (e.g., a real time video used in the context of video conferencing). Some or all of operations 602-608 may be repeated for each frame of the video as reflected by decision block 610. In this case, the same settings may be used for most frames in the video. Furthermore, results of certain processes (e.g., face detection) may be adapted for other frames.

Image Processing Apparatus Examples

Figure 7A:
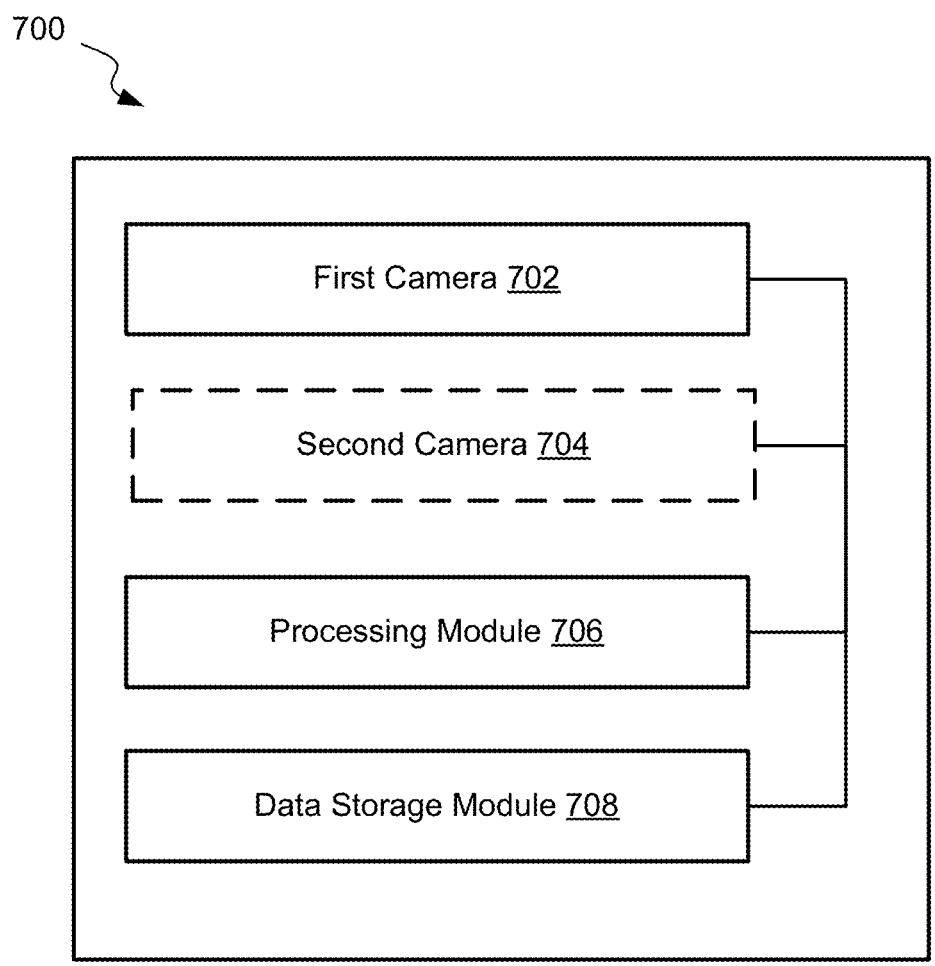
FIG. 7A is a schematic representation of various modules of an image capturing and processing device, in accordance with some embodiments.

FIG. 7A is a schematic representation of various modules of an image capturing and processing device 700, in accordance with some embodiments. Specifically, device 700 includes a first camera 702, a processing module 706, and a storage module 708. Device 700 may also include an optional second camera 704 (and may have a third camera, not shown). One or both cameras 702 and 704 may be equipped with lenses having relatively small lens apertures that result in a large depth of field. As such, the background of the resulting image can be very distracting, competing for the viewer's attention. Various details of camera positions are described above with reference to FIGS. 3-5.

In various embodiments, processing module 706 is configured for detecting at least one of a foreground portion or a background portion of the stereo image. Processing module 706 may also be configured for detecting an object in each of the two initial images, determining an object center line of the object in each of the two initial images, aligning the two initial images along the object center line, and cross-fading the two initial images along the object center line yielding a combined image. As noted above, the detecting operation separates the stereo image into at least the foreground portion and the background portion.

Storage module 708 is configured for storing initial images as well as combined images, and one or more setting used for the detecting and processing operations. Storage module 708 may include a tangible computer memory, such as flash memory or other types of memory.

Figure 7B:
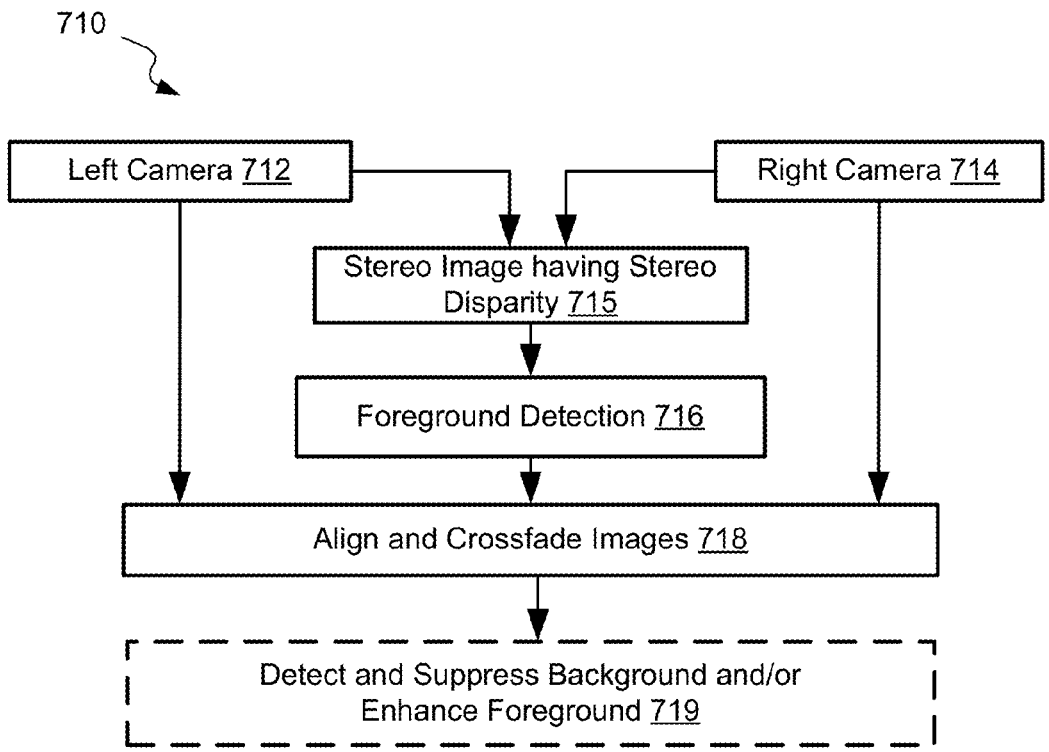
FIG. 7B is a schematic process flow utilizing stereo disparity of two images, in accordance with some embodiments.

FIG. 7B is a schematic process flow 710 utilizing a device with two cameras 712 and 714, in accordance with some embodiments. Camera 712 may be a left camera, while camera 714 may be a right camera. Cameras 712 and 714 generate a stereo image from which stereo disparity may be determined (block 715). This stereo disparity may be used for detection of at least the foreground portion of the stereo image (block 716). Face detection may also be used along with stereo disparity for the detection. Specifically, operation 718 involves aligning and crossfading the images captured by cameras 712 and 714. This operation yields a combined image, which may be further processed by separating the foreground and background portions and processing the background portion separately from the foreground portion, e.g., detecting and suppressing the background portion and/or enhancing the detected foreground portion (block 719). In some embodiments, the foreground and background portions may both be detected in block 716, obviating the need to detect the foreground portion in block 719.

Figure 7C:
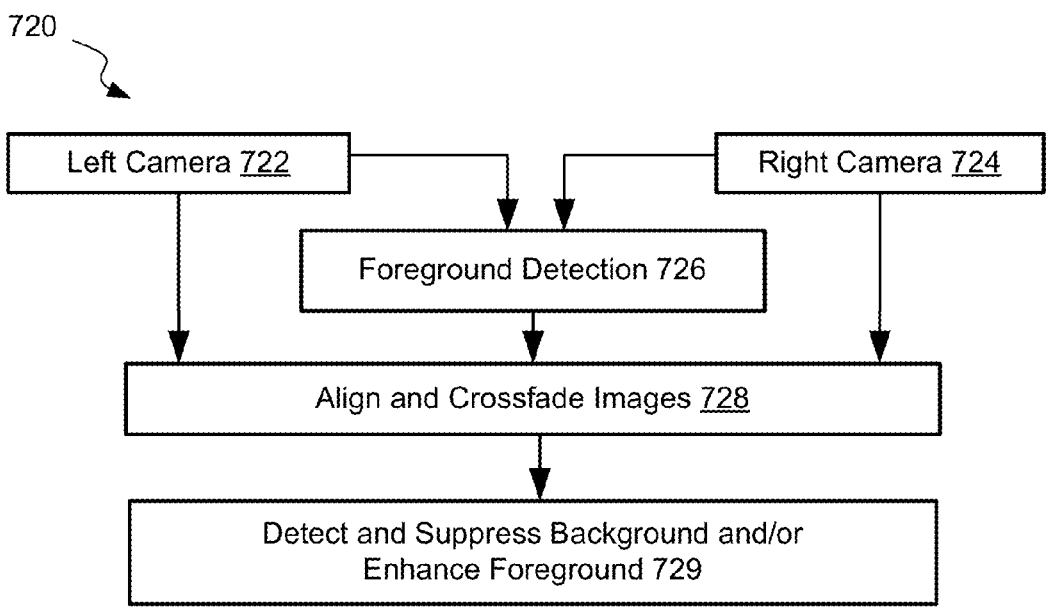
FIG. 7C is a schematic process flow that does not utilize stereo disparity, in accordance with some embodiments.

FIG. 7C is another schematic process flow 720 utilizing a device with two cameras 722 and 724, in accordance with some embodiments. Likewise, camera 722 may be a left camera, while camera 724 may be a right camera. However, images captured with cameras 722 and 724 may not be stereo images from which stereo disparity may be determined. Still detection of at least the foreground portion of the stereo images may be performed during operation 726. Various techniques that do not require stereo disparity may be used, such as motion parallax, local focus, color grouping, and face detection. Operation 728 involves aligning and crossfading the images captured by cameras 722 and 724. This operation yields a combined image, which may be further processed by separating the foreground and background portions and processing the background portion separately from the foreground portion, e.g., detecting and suppressing the background portion and/or enhancing the detected foreground portion (block 729). In some embodiments, the foreground and background portions may both be detected in operation 726, obviating the need to detect the background in block 729.

Computer System Examples

Figure 8:
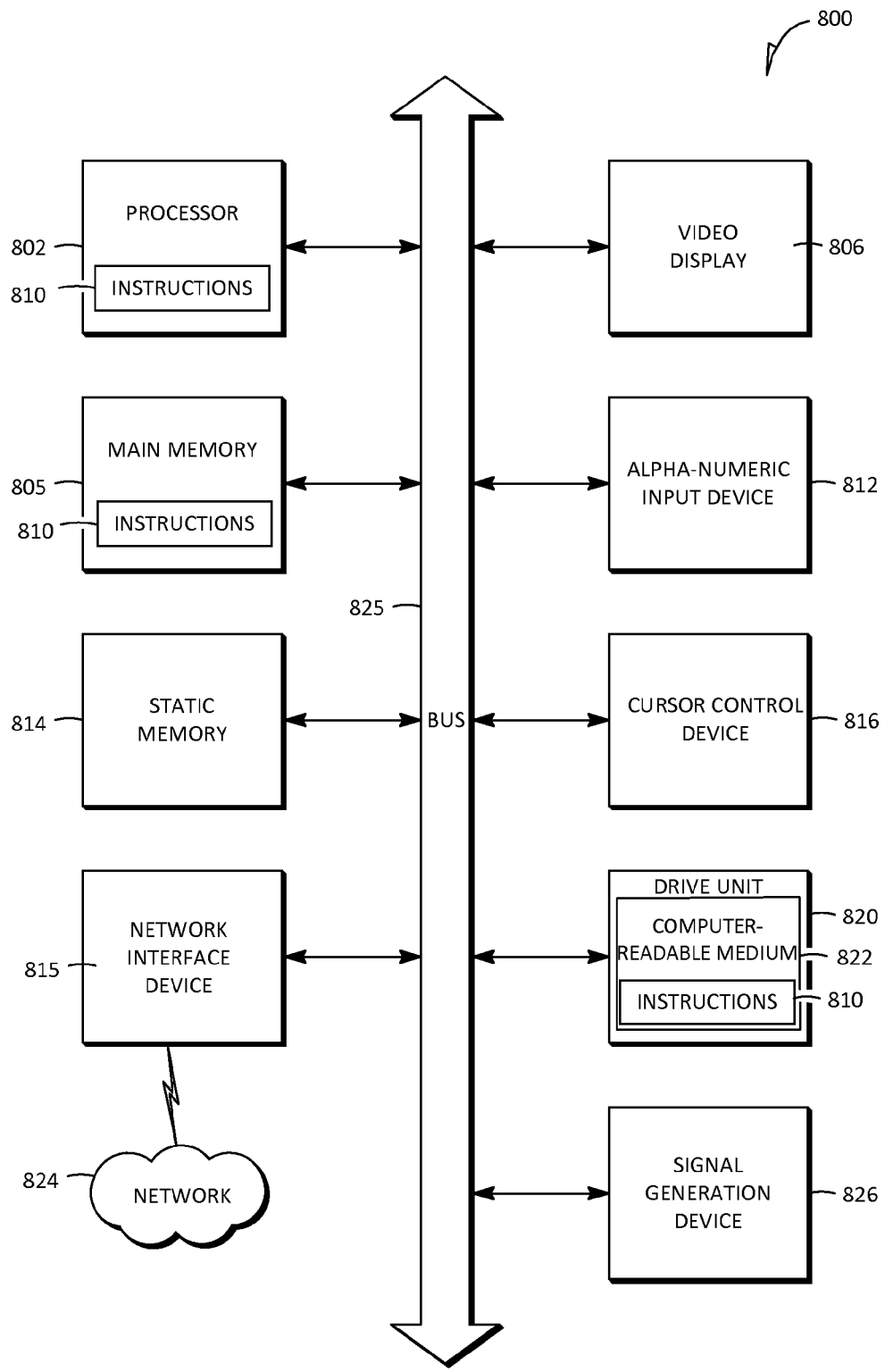
FIG. 8 is a diagrammatic representation of an example machine in the form of a computer system, within which a set of instructions for causing the machine to perform any one or more of the methodologies discussed herein may be executed.

FIG. 8 is a diagrammatic representation of an example machine in the form of a computer system 800, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor or multiple processors 802 (e.g., a central processing unit (CPU), a graphics processing unit (GPU), or both), and a main memory 805 and static memory 814, which communicate with each other via a bus 825. The computer system 800 may further include a video display unit 806 (e.g., a liquid crystal display (LCD)). The computer system 800 may also include an alpha-numeric input device 812 (e.g., a keyboard), a cursor control device 816 (e.g., a mouse), a voice recognition or biometric verification unit, a drive unit 820 (also referred to as disk drive unit 820 herein), a signal generation device 826 (e.g., a speaker), and a network interface device 815. The computer system 800 may further include a data encryption module (not shown) to encrypt data.

The disk drive unit 820 includes a computer-readable medium 822 on which is stored one or more sets of instructions and data structures (e.g., instructions 810) embodying or utilizing any one or more of the methodologies or functions described herein. The instructions 810 may also reside, completely or at least partially, within the main memory 805 and/or within the processors 802 during execution thereof by the computer system 800. The main memory 805 and the processors 802 may also constitute machine-readable media.

The instructions 810 may further be transmitted or received over a network 824 via the network interface device 815 utilizing any one of a number of well-known transfer protocols (e.g., Hyper Text Transfer Protocol (HTTP)).

While the computer-readable medium 822 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like.

The example embodiments described herein may be implemented in an operating environment comprising software installed on a computer, in hardware, or in a combination of software and hardware.

Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

What is claimed is:

1. A method of combining multiple related images to enhance image quality, the method comprising:
   receiving two initial images,
      each initial image comprising an object representation of an object, a first initial image from a left camera and a second initial image from a right camera,
      the object representation provided on a foreground portion of each initial image;
      each initial image corresponding to a different imaging angle relative to the object;
   determining the foreground portion of each initial image;
   separating the foreground portion from a background portion of each initial image;
   detecting the object in each initial image;
   determining an object center line of the object in each initial image; and
   cross-fading the two initial images along the object center line,
      wherein the cross-fading yields a combined image, the cross-fading further comprising:
      cross-fading the foreground portions of the two initial images; and
      independently, cross-fading the background portions of the two initial images;
      the cross-fading being applied such that a left side of the combined image is derived from the first initial image from the left camera,
      and a right side of the combined image is derived from the second initial image from the right camera.

2. The method of claim 1, further comprising capturing the two initial images, wherein the two initial images are captured using two or more cameras provided on one device.

3. The method of claim 2, wherein two of the two or more cameras are positioned at a distance of between about 30 millimeters and 150 millimeters from each other.

4. The method of claim 2, wherein the device is one of a laptop computer system, a tablet computer system, and a camera phone.

5. The method of claim 1, wherein the two initial images are stereo images and the detecting comprises analyzing the stereo disparity of the stereo image.

6. The method of claim 1, wherein the detecting comprises face detection.

7. The method of claim 1, wherein the detecting the object comprises one or more techniques selected from the group consisting of motion parallax, local focus, color grouping, and face detection.

8. The method of claim 1, wherein the detecting the object comprises face detection.

9. The method of claim 1, wherein the combined image comprises a combined foreground portion and a combined background portion, the combined foreground portion comprises a combined object created by cross-fading the objects of the two initial images.

10. The method of claim 9, further comprising changing one or more properties of the combined foreground portion, the one or more properties are selected from the group consisting of changing sharpness, changing color, suppressing, and changing saturation.

11. The method of claim 9, further comprising changing one or more properties of the combined background portion, the one or more properties are selected from the group consisting of changing sharpness, changing color, suppressing, and changing saturation.

12. The method of claim 11, wherein the combined background portion is blurred using one or more blurring techniques including at least one of circular blurring and Gaussian blurring.

13. The method of claim 11, wherein the combined background portion is blurred adaptively.

14. The method of claim 9, wherein the combined background portion is replaced with a new background image.

15. The method of claim 1, wherein the cross-fading the background portions of the two initial images comprises shifting at least some of the background portions in a direction towards the object center line.

16. The method of claim 1, further comprising repeating the receiving, determining, aligning, and cross-fading operations at least once.

17. The method of claim 1, wherein the two initial images represent one frame of a video.

18. The method of claim 1, further comprising capturing the two initial images at different times using one camera.

19. A method of combining multiple related images to enhance image quality, the method comprising:
   capturing two initial images using different cameras positioned on the same device, the cameras being positioned at a distance of between about 30 millimeters and 150 millimeters from each other, a first initial image from a left camera and a second initial image from a right camera;
   determining a foreground portion of each initial image;
   separating the foreground portion from a background portion of each initial image;
   determining an object center line in each foreground portion of the two initial images; and
   cross-fading the foreground portions of the two initial images along the object center line, wherein the cross-fading yields a combined image, the cross-fading further comprising independently, cross-fading the background portions of the two initial images;
   the cross-fading being applied such that a left side of the combined image is derived from the first initial image from the left camera, and a right side of the combined image is derived from the second initial image from the right camera.

20. A device comprising:
   a first camera;
   a second camera,
      wherein a distance between the first camera and the second camera is between about 30 millimeters and 150 millimeters,
      wherein the first camera and the second camera are configured to capture two initial images of the same object from different imaging angles, a first initial image from the first camera and a second initial image from the second camera;
   a processing module being configured for detecting an object in each of the two initial images, determining an object center line of the object in each of the two initial images, determining a foreground portion of each initial image, separating the foreground portion from a background portion of each initial image, aligning the two initial images along the object center line, and cross-fading the two initial images along the object center line yielding a combined image, the cross-fading further comprising cross-fading the foreground portions of the two initial images and independently, cross-fading the background portions of the two initial images, the cross-fading being applied such that a left side of the combined image is derived from the first initial image from a left one of the first and second cameras, and a right side of the combined image is derived from the second initial image from a right one of the first and second cameras; and a storage module for storing the two initial images and the combined image.

\* \* \* \* \*